United States Patent

Reiss

[11] 3,924,133
[45] Dec. 2, 1975

[54] DEVICE FOR MEASURING DENSITY OF SUBSTANCES BY PENETRATING RAYS

[75] Inventor: Karl-Hanz Reiss, Erlangen, Germany

[73] Assignee: Siemens Aktiengesellschaft, Munich, Germany

[22] Filed: Aug. 10, 1971

[21] Appl. No.: 170,497

[30] Foreign Application Priority Data
Aug. 27, 1970 Germany............................ 2042009

[52] U.S. Cl................................. 250/408; 250/402
[51] Int. Cl.[2]........................................ H05G 1/30
[58] Field of Search .............. 250/95, 97, 100, 103; 250/402, 408

[56] References Cited
UNITED STATES PATENTS
2,962,594  11/1960  Duffy, Jr........................ 250/103 X
3,546,461  12/1970  Craig ..................................... 250/95

*Primary Examiner*—Archie R. Borchelt
*Attorney, Agent, or Firm*—Richards & Geier

[57] ABSTRACT

A device for measuring density of substances of living objects without damaging them by penetrating rays, has as the ray source an X-ray device with a ray measuring device located behind the object being measured. The ray measuring device produces electrical values corresponding to the measured ray intensity values. The invention is particularly characterized by a switching device used for switching to a higher value and in rhythmical sequence the high voltage applied to the X-ray tube and having a low value which, however, is clearly above the K-absorption edge of the body substance. There is also an actuating device synchronized by the switch-over frequency which weakens the ray intensity during the application of the high voltage value in such manner that for two voltage values behind an average object intensity values are present corresponding to the linear measuring range of the ray measuring device. The ray measuring device integrates for a certain constant time period the crest range of electrical values measuring during each time period when the X-ray tube was switched on and forms a quotient from the two values.

6 Claims, 2 Drawing Figures

DEVICE FOR MEASURING DENSITY OF SUBSTANCES BY PENETRATING RAYS

This invention relates to a device for measuring density of substances of objects, particularly living objects without damaging them, by penetrating rays, wherein the source of rays is an X-ray device with a ray measuring device located behind the object being measured and producing electrical values corresponding to the measured ray intensity values.

Devices of this type are known. They use a scintillation counter as the ray measuring device. Such a ray measuring device is comparatively expensive and, furthermore, it requires monochromatic ray emission. since the usual X-ray device produces polychromatic ray emission a substantial further expense is necessary as far as the production of rays is concerned.

An object of the present invention is to produce a device which utilizes extensively existing structural elements and will make it possible even for technically untrained persons, such as medical personnel to measure density of substances of living objects as a matter of routine.

Other objects of the present invention will become apparent in the course of the following specification.

In the accomplishment of the objectives of the present invention it was found desirable to provide a switching device which switches to a higher value and in rythmical sequence the voltage of the X-ray tube having a low value which, however, is clearly above the K-absorption edge of the body substance. An actuating device is also provided which is synchronized by the switch-over frequency and which weakens the ray intensity during the application of the high voltage in such manner that the two voltage values behind average object intensity values are present corresponding to the linear measuring range of the ray measuring device. The ray measuring device integrates for a certain constant time period the crest range of electrical values measured during each time period when the X-ray tube was switched on and forms a quotient from the two values.

This so-called two spectrum method is based on the following consideration:

Within the voltage range above the K-absorption edges the X-ray absorption is primary Compton scatter. This means that the mass absorption coefficients ($\mu/\sigma$) approach the same value for all substances present in living objects for a specific ray energy (tube voltage), so that then only the density of the substance being penetrated by rays determines the ray absorption, i.e., in case of different density the difference of X-ray density. Obviously, the scattered radiation must be eliminated to a great extent by corresponding narrow collimating. If it is desired to measure the density in this manner, the relations must be completely constant from the point of view of the rays and also as far as the ray measuring device is concerned. It should be noted that in the practice substantial errors occur when measuring with the often used simple densitometic measurement with X-ray film, particularly during the development of the film and due to the lack of linearity of the Hunter and Driffield curve of the film.

All these drawbacks are eliminated by the two spectrum method of the present invention. This method is based on the fact that the weakening to which a ray emission of a certain energy range is subjected in a body, depends on the density of substances of the body and the ray energy. Special means must be provided solely for maintaining constant the tube high voltage which is already available for larger X-ray installations.

In order to come from the quotient produced by the ray measuring device to the average space density of the object or to the mineral salt content of a bone structure or the like, this quotient must be only compared with one of a standard object, in order to obtain initially the so-called surface coating density. When this surface coating density is then placed in a ratio to the volume of the object being measured, the desired density value is obtained.

According to a further embodiment of the present invention the switching takes place synchronously in the power line in such manner that the lower voltage is effective during a half wave of the power line frequency and that the higher voltage is effective during the following half wave. Due to this arrangement the difference value of the ray intensity can be indicated continuously without complicated store electronics.

To operate the device of the present invention along with existing X-ray apparatus, the present invention further suggests the use of an additional generator to produce the two voltage values, which will produce a voltage average value supplied from the main generator and corresponding to one of the half voltage differences between the high and the low voltage values when in case of one switching the additional high voltage is supplied additively and in the case of the other switching the additional high voltage is supplied subtractively.

A further available feature of the present invention in case existing X-ray devices are used, consists in that a transporting device is used for diminishing ray intensity which during the application of the high voltage value introduces a ray filter in the ray beam projection between the X-ray tube and the object being measured.

According to another feature of the present invention when an X-ray television device is available the ray intensity measurement can be carried out by the pickup tube instead of the photomultiplier, the signal of which is then supplied to the measuring electronic in a manner corresponding to that of the photomultiplier.

The invention will appear more clearly from the following detailed description when taken in connection with the accompanying drawings showing by way of example only, a preferred embodiment of the inventive idea.

Figure 1:
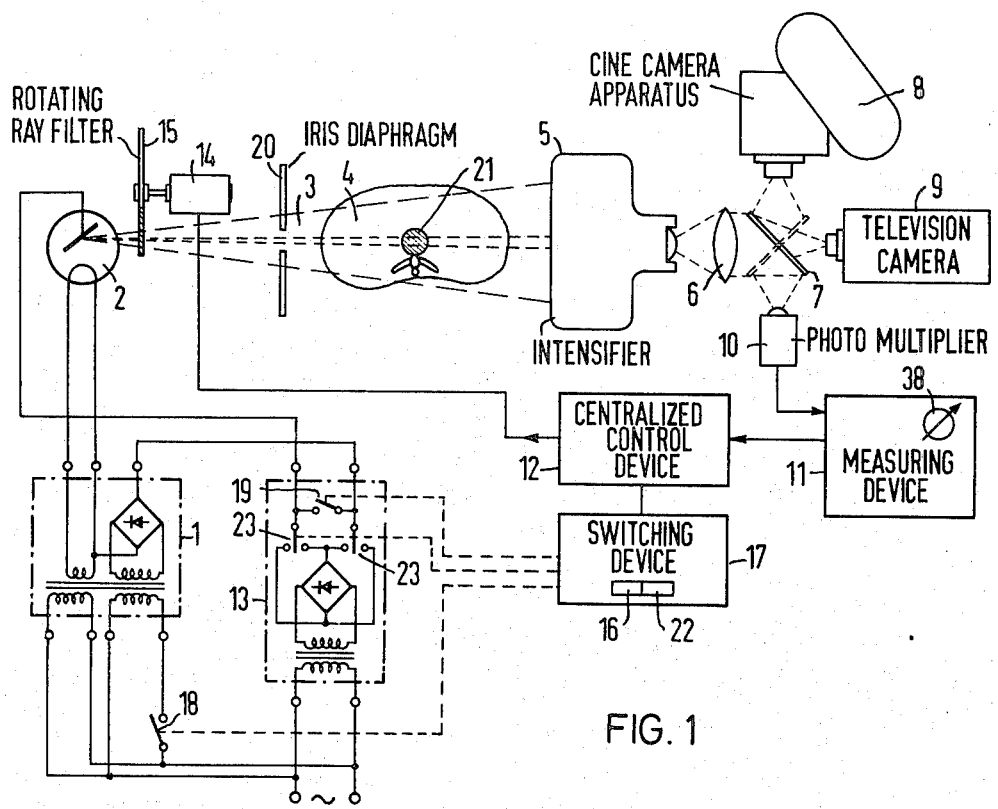
FIG. 1 illustrates diagrammatically the device in its entirety.

As shown in FIG. 1, the core of the device consists of an X-ray generator 1. For the sake of simplicity of illustration its setting, controlling and regulating means have not been shown. There is an X-ray tube 2 producing a beam of X-rays 3 to which a patient 4 is subjected. The ray image of the patient passes through an X-ray intensifier 5, the optics 6 and a swingably semi-transparent mirror 7 which can be selectively directed to a film camera 8 or an television camera 9 of an X-ray televison camera which is not further illustrated. In both cases the image brightness is measured by the photomultiplier 10 as a component part of the ray measuring device 11 and is supplied to it as the measured current value.

In order to use this device to measure thicknesses of the component parts of the object 4, a control device 12 is used which operates as follows the additional high voltage generator 13, the driving motor 14 for the ray filter 15 rotating within the cone of rays, as well as the ray measuring device 11:

Initially by pressing the button 16 of the switching device 17a supervisory fluoroscopy is switched on. For that purpose the switches 17 and 18 are closed from the switching device, so that voltage produced by the high voltage generator 1 reaches the X-ray tube. The iris diaphragm 20 is completely open so that the part of the measured object 4 which lies in the beam projection will be shown upon the monitor of the X-ray television unit (not shown). On the basis of this supervisory fluoroscopy of iris diaphragm 20 is set to that part of the object the thickness of which is to be measured, for example, the vertebra body 21. By pressing the button 22 the switching device opens the switch 19 of the additional high voltage generator and actuates the pole changing switch 23 of the additional high voltage generator in such manner that the voltage of the additional generator of 37.5 kV is mixed with the voltage of the high voltage generator 1 of 112.5 kV in such manner that it is added during one half wave of the net frequency and is subtracted during the following half wave. Furthermore, the switching device starts in motion the driving motor 14 of the filter 15 and operates it in synchronism with the pole changing switch in such manner that the filter is located in the path of the X-ray beam projection only during the additive mixing of the additional high voltage. Furthermore, the control device operates the ray measuring device in such manner that it also measures separately in synchronism with the pole switch 23 the intensity values of the X-rays at the additive and subtracting mixing of the additional high voltage. The filter has such measurements that the jump in intensity taking place between the two voltages of 75 as well as 150 kV remains within the limits of the linear measuring range of the ray measuring device.

Figure 2:
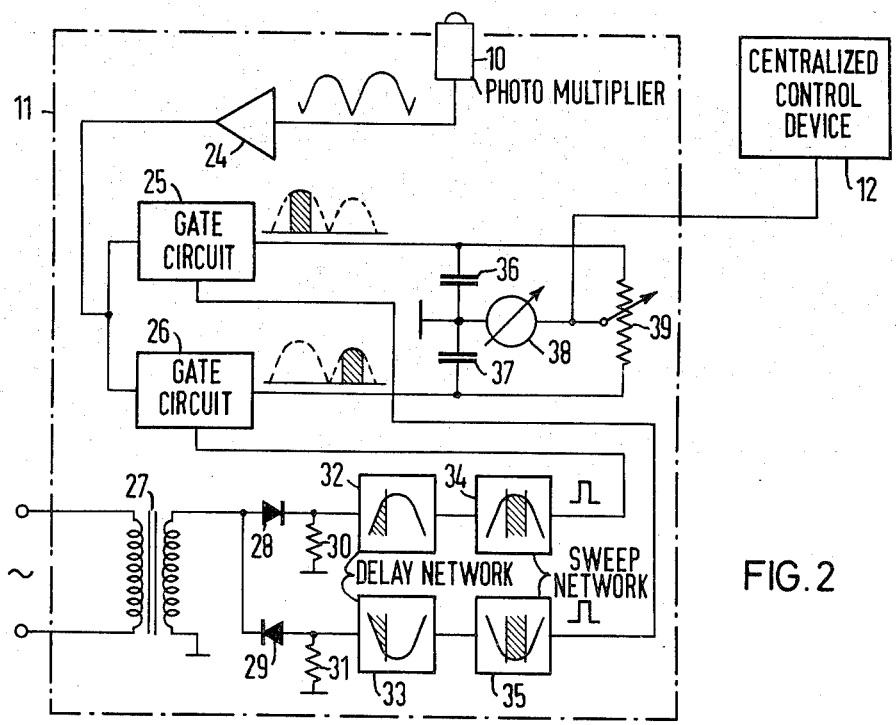
FIG. 2 is a circuit diagram of the ray measuring device.

As shown in FIG. 2 which illustrates the basic circuit of the ray measuring device, the measured values appearing at the photomultiplier 10 are supplied to the amplifier 24 to which the two gate circuits 25 and 26 are connected. These two gate circuits are opened for a short time in synchronism with the net substantially at the crest points of the amplitudes belonging to both tube voltage values. For that purpose there is used a synchronizing device consisting of a transformer 27, the two rectifiers 28 and 29 and the operating resistances 30 and 31 which steer through delay networks 32 and 33 the sweep oscillators 34 and 35 to the desired phase points, so that they produce a rectangular impulse which opens the gate circuits 25 and 26 at the desired time and for the desired duration. Rectangular impulses which are produced by these gate circuits and which correspond to ray intensity values measured by the photomultiplier at these time periods, are then supplied to measuring condensers 36 and 37 joined in a bridge connection, the difference in voltage of which can be read upon an indicating instrument 38. The adjustable resistance 39 serves to balance the bridge connection.

The value indicated by the instrument 38 is a measure for the so-called surface covering density. To determine from this value the desired space density the surface covering density must be related to the space value of the measured part of the object. This can take place with the use of a comparatively simple computer program, for example, by means of an electronic table computer.

It is easily apparent that the described device has the advantage over prior art processes of densimetric type that all linearly working variations as well as electrical values of the X-ray tube and the ray measuring device are compensated to a great extent. When, for example, the line voltage varies and as the result of that the sensitiveness of the ray measured device or the emitting current of the X-ray tube are changed, these changes are of no significance, since they have the same effect on both spectrums and do not influence the ratio of the integrated intensities of the two spectrums. Possible variations of the tube voltage have, however, as a rule a greater linear effect upon ray intensities. Thus it is merely necessary to provide known means for keeping the X-ray tube constant within the range of the desired precision of measurements.

I claim:

1. A device for measuring density of substances of living objects, comprising an X-ray tube device adapted to project X-rays upon an object, a ray measuring device adapted to be located behind the object and producing electrical values corresponding to ray intensity values, a generator supplying the X-ray tube with high voltage, a switching device connected with said X-ray tube device and with said ray measuring device and switching a low value of the high voltage which, however, is clearly above the K-absorption edge of the object body, in rhythmical sequence to a higher value, and an actuating device connected with said X-ray tube device and with said ray measuring device and synchronized by the switching frequency to lower the ray intensity during the application of the high voltage value in such manner that for two voltage values behind an average object intensity values are present corresponding to the linear measuring range of said ray measuring device, said ray measuring device integrating for a certain constant time period the crest range of electrical values measured during each time period when the X-ray tube was switched on and forming a quotient from the two values.

2. A device in accordance with claim 1, wherein the switching takes place synchronously in such manner that the lower voltage is effective during a half wave of the line frequency and the higher voltage is effective during the following half wave.

3. A device in accordance with claim 1, comprising an additional generator connected with said switching device and producing additional high voltage corresponding to the half voltage difference between the high and low voltage values and supplied to the voltage average value produced by the first-mentioned generator additively during one switching and subtractively during the other switching.

4. A device in accordance with claim 1, comprising a transporting device connected with said X-ray tube device for lowering the ray intensity, said transporting device comprising a ray filter and means introducing said ray filter into the X-rays between the X-ray tube and the object being examined while the high voltage value is applied.

5. A device in accordance with claim 1, wherein the low voltage value is substantially 75 kV and the high voltage value is substantially 150 kV.

6. A device in accordance with claim 1, wherein said ray measuring device comprises a ray receiver consisting of a camera tube of an X-ray television unit.

\* \* \* \* \*